United States Patent Office 2,904,326
Patented Sept. 15, 1959

2,904,326

DEVICES RESPONSIVE TO THE SPEED OF A ROTATING SHAFT AND IN PARTICULAR TO CENTRIFUGAL GOVERNORS

Paul Panhard, Paris, France, assignor to Societe Anonyme des Anciens Etablissements Panhard et Levassor, Paris, France, a society of France Application March 5, 1958, Serial No. 719,414

Claims priority, application France March 8, 1957

1 Claim. (Cl. 264—18)

The present invention relates to devices responsive to the speed of a rotating shaft and in particular to centrifugal speed governors.

In known centrifugal speed governors including centrifugal masses and springs, the operation is generally stable only within a small range of variations of the speed.

The chief object of the present invention is to provide a speed responsive device which is free from this limitation and in particular which can operate for speeds of the driving shaft ranging from 800 revolutions per minute to 5,000 to 6,000 revolutions per minute, whereby such a device can then be used for controlling automatic gear boxes.

Another object of this invention is to provide a device of this kind which is both very simple in construction and operation and very accurate.

For this purpose, in a system including centrifugal means for controlling the discharge circuit of a pump which feeds liquid under pressure to a hydraulic servo-motor, said means consist of an expansible ring driven in rotation by said shaft and mounted floating in a recess the inner wall of which is in the form of a surface of revolution, said surface forming at least two annular grooves adjoining each other and separated from each other by a circular ridge located opposite the outer wall of said ring, one of said grooves being in communication with the outlet of said pump and the other with a discharge pipe, whereby the amount of liquid allowed to leak out to said discharge pipe through the annular space left between said ridge and said ring decreases when the speed of said shaft increases and the liquid pressure transmitted to said servo-motor is proportional to the square of said speed.

A preferred embodiment of this invention will be hereinafter described with reference to the accompanying drawings given merely by way of example and in which.

Figure 1:
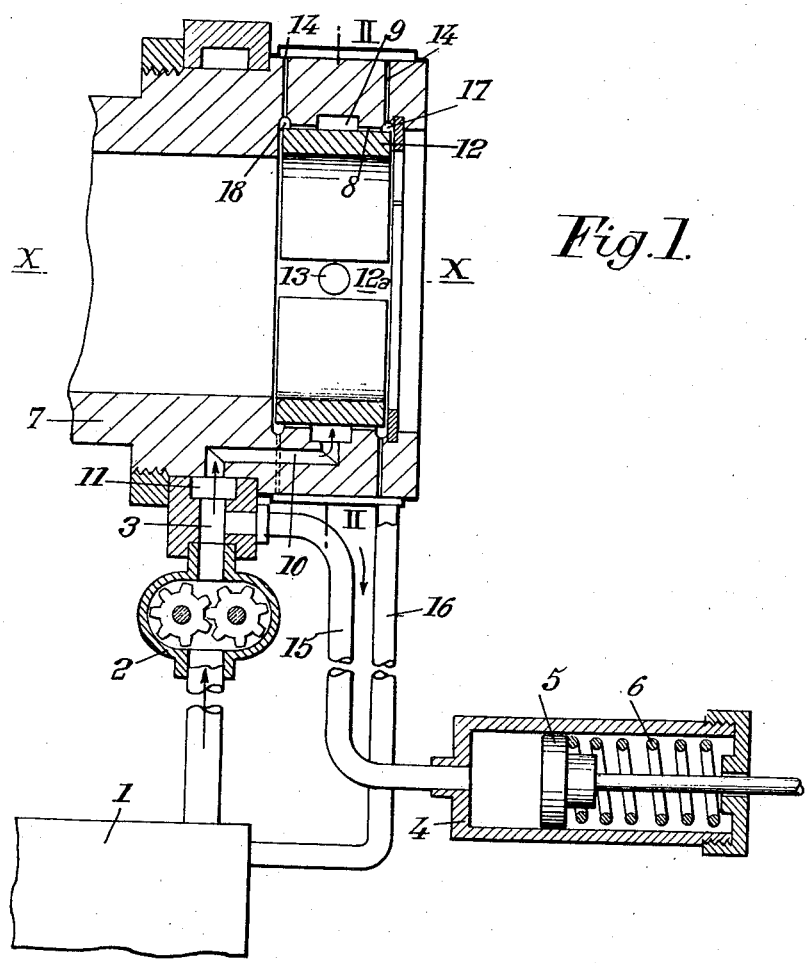
Fig. 1 is a diagrammatic axial sectional view of a device according to the present invention.
Figure 2:
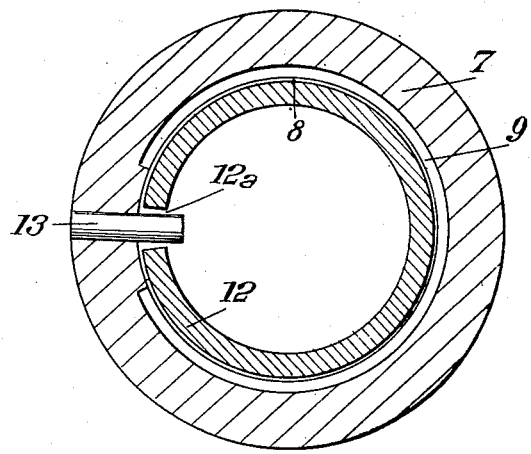
Fig. 2 is a sectional view on the line II—II of Fig. 1.

The speed responsive device shown by the drawings is intended to supply a hydraulic servo-motor or jack 4 including a piston 5 and a spring 6 with a liquid pressure proportional to the square of the rotational speed of the shaft 7 which rotates about axis X—X.

For this purpose, a pump 2 having its inlet connected with a liquid (oil) tank 1 supplies, through a passage 3 provided in a fixed connection member 11 and through a conduit 10 provided in shaft 7, liquid to a circular groove formed in a recess 8 provided in said shaft. A split ring 12 is mounted floating in said recess concentrically with said groove. Said recess 8 is also provided with two other grooves 17 and 18 located on either side of groove 9. The outer wall of ring 12 runs very close to the ridges separating groove 9 from grooves 17 and 18. Ring 12 is driven by shaft 7 through a pin 13 carried by said shaft and engaged in the slot 12a of said ring. The wall of shaft 7 is provided with a discharge conduit 14 forming a communication between grooves 17 and 18 and a discharge conduit 16 leading back to tank 1.

The oil under pressure fed by the pump is conveyed from passage 3 to jack 4 through a conduit 15.

When shaft 7 is not rotating at a sufficient speed, the oil flowing through passage 3 and conduit 10 into groove 9 escapes therefrom through the leak spaces existing between the outer wall of ring 12 and the ridges separating groove 9 from grooves 17 and 18. Oil then flows back from said grooves 17 and 18 through passages 14 to discharge pipe 16. The pressure transmitted to jack 4 is negligible.

On the contrary, when the speed of shaft 7 increases, ring 12 is applied by the centrifugal force against the ridges of groove 9, thus reducing more and more the dimensions of the leak passages between groove 9 and grooves 17 and 18. The pressure of the liquid in annular groove 9 and therefore the pressure fed to jack 4 increases until it causes split ring 12 to retract sufficiently to permit the liquid to leak out through passages 8 to discharge passages 14. This pressure, which is that transmitted to jack 4, is then proportional to the centrifugal force exerted by ring 12, that is to say to the square of the rotational speed of ring 12 and shaft 7.

The play between the edges of ring 12 and shaft 7 is sufficiently small to make negligible the oil leaks, as compared with the flow rate of the pump.

It should be noted that a retraction of ring 12 of one tenth of a millimeter is sufficient to permit oil to leak out to the discharge conduit.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claim.

What I claim is:

In combination, a rotating shaft, said shaft being provided with an inner recess the wall of which is in the form of a surface of revolution about the shaft axis, said surface forming two annular grooves adjacent to each other and separated by a circular ridge, a hydraulic servo-motor, a liquid pump having its outlet in communication with said servo-motor, a discharge pipe, conduit means for connecting one of said grooves with the outlet of said pump, conduit means for connecting the other of said grooves with said discharge pipe, a ring mounted floating in said recess so as to be located opposite said ridge, said ring having a radial slot formed therein at one point of its circumference, so as to be expansible, and a pin carried by the inner wall of said recess and projecting into said slot, to rotate said ring about its axis at the speed of said shaft, whereby the annular passage between the outer wall of said ring and said ridge is the smaller as the speed of rotation of said shaft is higher.

References Cited in the file of this patent

UNITED STATES PATENTS

| | | |
|---|---|---|
| 1,440,224 | Kasley | Dec. 26, 1922 |
| 1,899,142 | Erickson | Feb. 28, 1933 |
| 2,282,543 | Kincaid | May 12, 1942 |